(12) United States Patent
Shindo et al.

(10) Patent No.: US 7,559,856 B2
(45) Date of Patent: *Jul. 14, 2009

(54) GOLF BALL

(75) Inventors: Jun Shindo, Chichibu (JP); Eiji Takehana, Chichibu (JP); Kae Yamazaki, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/878,951

(22) Filed: Jul. 27, 2007

(65) Prior Publication Data

US 2008/0020864 A1 Jan. 24, 2008

Related U.S. Application Data

(63) Continuation-in-part of application No. 11/324,297, filed on Jan. 4, 2006, now Pat. No. 7,294,067.

(30) Foreign Application Priority Data

Jul. 2, 2007 (JP) ............................. 2007-174014

(51) Int. Cl.
A63B 37/06 (2006.01)
(52) U.S. Cl. .................................................. 473/378
(58) Field of Classification Search ................. 473/378, 473/351
See application file for complete search history.

(56) References Cited

U.S. PATENT DOCUMENTS

| 6,184,276 | B1 | 2/2001 | Ignatz-Hoover |
| 6,194,505 | B1 | 2/2001 | Sone et al. |
| 6,277,924 | B1 | 8/2001 | Hamada et al. |
| 6,372,847 | B1 | 4/2002 | Wouters |
| 6,596,801 | B2 | 7/2003 | Higuchi et al. |
| 6,602,941 | B2 | 8/2003 | Higuchi et al. |
| 6,634,961 | B2 | 10/2003 | Higuchi et al. |
| 6,695,716 | B2 | 2/2004 | Higuchi et al. |
| 6,712,715 | B2 | 3/2004 | Higuchi et al. |
| 6,786,836 | B2 | 9/2004 | Higuchi et al. |
| 6,795,172 | B2 | 9/2004 | Putman et al. |
| 6,818,705 | B2 | 11/2004 | Wu et al. |
| 6,841,642 | B2 | 1/2005 | Kaszas |
| 6,921,345 | B2 | 7/2005 | Higuchi et al. |
| 6,923,735 | B1 | 8/2005 | Hayashi |
| 7,250,010 | B1 * | 7/2007 | Shindo et al. ............... 473/351 |
| 7,294,067 | B2 * | 11/2007 | Shindo et al. ............... 473/351 |
| 2002/0111407 | A1 * | 8/2002 | Takesue et al. ............. 524/322 |
| 2004/0147694 | A1 | 7/2004 | Sone et al. |
| 2005/0148723 | A1 | 7/2005 | Kondou |

FOREIGN PATENT DOCUMENTS

| JP | 7-268132 A | 10/1995 |
| JP | 11-35633 A | 2/1999 |
| JP | 2002-355336 A | 12/2002 |
| JP | 2002-355337 A | 12/2002 |
| JP | 2002-355338 A | 12/2002 |
| JP | 2002-355339 A | 12/2002 |
| JP | 2002-355340 A | 12/2002 |
| JP | 2002-356581 A | 12/2002 |
| JP | 2004-292667 A | 10/2004 |
| WO | WO 03/082925 | 10/2003 |

OTHER PUBLICATIONS

"Report of Research & Development", Fine Chemical, vol. 23, No. 9, p. 5-15 (1994).
"Hydrolysis of Tri-tert-butylaluminum" by Mason et al., J. American Chemical Society, vol. 115, pp. 4971-4984 (1993).
"Three-Coordinate Aluminum Is Not a Prerequisite for Catalytic Activity in the Zirconocene-Alumoxane Polymerization of Ethylene", by Harlen et al, J. American Chemical Society, vol. 117, pp. 6465-6474, (1995).

* cited by examiner

*Primary Examiner*—Raeann Trimiew
(74) *Attorney, Agent, or Firm*—Sughrue Mion, PLLC

(57) ABSTRACT

The present invention provides a golf ball having a core and a cover of one or more layer. The core is made of a material obtained by molding under heat a rubber composition containing (a) polybutadiene having a stress relaxation time ($T_{80}$) of 3.5 or less, (b) an unsaturated carboxylic acid and/or a metal salt thereof, and (c) an organic peroxide. A least one layer of the cover is made of a heated mixture which includes (A) an olefin-unsaturated carboxylic acid random copolymer and/or an olefin-unsaturated carboxylic acid-unsaturated carboxylic acid ester random copolymer, (B) a fatty acid having a molecular weight of at least 280 or a derivative thereof, and (C) a basic inorganic metal compound capable of neutralizing acid groups in components A and B. The golf ball can be efficiently manufactured, and synergistic effects between the core material and the cover material enhance the rebound of the ball.

18 Claims, No Drawings

GOLF BALL

CROSS-REFERENCE TO RELATED APPLICATION

This application is a continuation-in-part of application Ser. No. 11/324,297 filed on Jan. 4, 2006 now U.S. Pat. No. 7,294,067, the entire contents of which are hereby incorporated by reference.

This application claims priority under 35 U.S.C. §119(a) on Patent Application No. 2007-174014 filed in Japan on Jul. 2, 2007, the entire contents of which are hereby incorporated by reference.

BACKGROUND OF THE INVENTION

The present invention relates to a golf ball having an excellent rebound.

Efforts to confer golf balls with an excellent rebound have until now focused on and optimized one or more indicator of the polybutadiene used as the base rubber, such as the Mooney viscosity, polymerization catalyst, solvent viscosity and molecular weight distribution. See, for example, Patent Document 1: JP-A 2004-292667; Patent Document 2: U.S. Pat. No. 6,818,705; Patent Document 3: JP-A 2002-355336; Patent Document 4: JP-A 2002-355337; Patent Document 5: JP-A 2002-355338; Patent Document 6: JP-A 2002-355339; Patent Document 7: JP-A 2002-355340; and Patent Document 8: JP-A 2002-356581.

For example, Patent Document 1 (JP-A 2004-292667) describes, as a base rubber for golf balls, a polybutadiene having a Mooney viscosity of 30 to 42 and a molecular weight distribution (Mw/Mn) of 2.5 to 3.8. Patent Document 2 (U.S. Pat. No. 6,818,705) describes, for the same purpose, a polybutadiene having a molecular weight of at least 200,000 and a resilience index of at least 40.

In addition, JP-B 3729243 describes a highly neutralized ionomer resin which has an excellent thermal stability, flow properties and moldability, and is also endowed with an excellent resilience.

However, because many golfers desire golf balls capable of traveling a longer distance, there exists a need for the development of golf balls having an even better rebound.

Patent Document 1: JP-A 2004-292667
Patent Document 2: U.S. Pat. No. 6,818,705
Patent Document 3: JP-A 2002-355336
Patent Document 4: JP-A 2002-355337
Patent Document 5: JP-A 2002-355338
Patent Document 6: JP-A 2002-355339
Patent Document 7: JP-A 2002-355340
Patent Document 8: JP-A 2002-356581
Patent Document 9: JP-B 3729243

SUMMARY OF THE INVENTION

As a result of extensive investigations, the inventor has discovered that, in a golf ball composed of a core and a cover of one or more layer, a good ball rebound is maintained by forming the core of a material obtained by molding under heat a rubber composition which includes a base rubber containing a polybutadiene having a specific $T_{80}$ value, an unsaturated carboxylic acid and/or a metal salt thereof, and an organic peroxide; and by forming at least one cover layer of a heated mixture selected from among (I), (II) and (III) below. In addition, by forming the cover of a highly neutralized ionomer resin having a good thermal stability, flow properties and moldability, the ball can be efficiently manufactured, and synergistic effects between the core material and the cover material greatly enhance the rebound of the ball.

(I) Heated mixtures which include:
(A) 100 parts by weight of an olefin-unsaturated carboxylic acid random copolymer and/or an olefin-unsaturated carboxylic acid-unsaturated carboxylic acid ester random copolymer,
(B) from 5 to 80 parts by weight of a fatty acid having a molecular weight of at least 280 or a derivative thereof, and
(C) from 0.1 to 10 parts by weight of a basic inorganic metal compound capable of neutralizing acid groups in components A and B;
and which have a melt index of at least 1.0 dg/min.

(II) Heated mixtures which include:
(D) 100 parts by weight of a metal ion neutralization product of an olefin-unsaturated carboxylic acid random copolymer and/or a metal ion neutralization product of an olefin-unsaturated carboxylic acid-unsaturated carboxylic acid ester random copolymer,
(B) from 5 to 80 parts by weight of a fatty acid having a molecular weight of at least 280 or a derivative thereof, and
(C) from 0.1 to 10 parts by weight of a basic inorganic metal compound capable of neutralizing acid groups in components D and B;
and which have a melt index of at least 1.0 dg/min.

(III) Heated mixtures which include:
100 parts by weight of, in admixture, (A) an olefin-unsaturated carboxylic acid random copolymer and/or an olefin-unsaturated carboxylic acid-unsaturated carboxylic acid ester random copolymer and (D) a metal ion neutralization product of an olefin-unsaturated carboxylic acid random copolymer and/or a metal ion neutralization product of an olefin-unsaturated carboxylic acid-unsaturated carboxylic acid ester random copolymer,
(B) from 5 to 80 parts by weight of a fatty acid having a molecular weight of at least 280 or a derivative thereof, and
(C) from 0.1 to 10 parts by weight of a basic inorganic metal compound capable of neutralizing acid groups in components A, D and B;
and which have a melt index of at least 1.0 dg/min.

Accordingly, the invention provides the following golf ball.

[1] A golf ball comprising a core and a cover of one or more layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; and at least one layer of the cover is made of a heated mixture which includes (A) 100 parts by weight of an olefin-unsaturated carboxylic acid random copolymer and/or an olefin-unsaturated carboxylic acid-unsaturated carboxylic acid ester random copolymer, (B) from 5 to 80 parts by weight of a fatty acid having a molecular weight of at least 280 or a derivative thereof and (C) from 0.1 to 10 parts by weight of a basic inorganic metal compound capable of neutralizing acid groups in components A and B, and which has a melt index of at least 1.0 dg/min.

[2] A golf ball comprising a core and a cover of one or more layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; and at least one layer of the cover is made of a heated mixture which includes (D) 100 parts by weight of a metal ion neutralization product of an olefin-unsaturated carboxylic acid random copolymer and/or a metal ion neutralization product of an olefin-unsaturated carboxylic acid-unsaturated carboxylic acid ester random copolymer, (B) from 5 to 80 parts by weight of a fatty acid having a molecular weight of at least 280 or a derivative thereof and (C) from 0.1 to 10 parts by weight of a basic inorganic metal compound capable of neutralizing acid groups in components D and B, and which has a melt index of at least 1.0 dg/min.

[3] A golf ball comprising a core and a cover of one or more layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; and at least one layer of the cover is made of a heated mixture which includes 100 parts by weight of, in admixture, (A) an olefin-unsaturated carboxylic acid random copolymer and/or an olefin-unsaturated carboxylic acid-unsaturated carboxylic acid ester random copolymer and (D) a metal ion neutralization product of an olefin-unsaturated carboxylic acid random copolymer and/or a metal ion neutralization product of an olefin-unsaturated carboxylic acid-unsaturated carboxylic acid ester random copolymer, (B) from 5 to 80 parts by weight of a fatty acid having a molecular weight of at least 280 or a derivative thereof and (C) from 0.1 to 10 parts by weight of a basic inorganic metal compound capable of neutralizing acid groups in components A, D and B, and which has a melt index of at least 1.0 dg/min.

[4] The golf ball of any one of [1] to [3], wherein the rubber composition further comprises (d) an organosulfur compound.

[5] The golf ball of any one of [1] to [3], wherein the polybutadiene having a stress relaxation time ($T_{80}$) of 3.5 or less accounts for at least 40 wt % of the base rubber.

[6] The golf ball of any one of [1] to [3], wherein the polybutadiene having a stress relaxation time ($T_{80}$) of 3.5 or less is a polybutadiene prepared using a rare-earth catalyst.

[7] The golf ball of any one of [1] to [3], wherein the polybutadiene having a stress relaxation time ($T_{80}$) of 3.5 or less is a polybutadiene prepared by polymerization using a rare-earth catalyst, followed by terminal modification.

[8] The golf ball of any one of [1] to [3], wherein the basic inorganic metal compound is selected from the group consisting of magnesium oxide, magnesium hydroxide, magnesium carbonate, zinc oxide, sodium hydroxide, sodium carbonate, calcium oxide, calcium hydroxide, lithium hydroxide and lithium carbonate.

DETAILED DESCRIPTION OF THE INVENTION

The invention is described more fully below.

The golf ball of the invention has a core and a cover of one or more layer. The core is not limited to one layer, and may, if necessary, be composed of two or more layers. The core is made of a material obtained by molding under heat a rubber composition which includes the following components (a) to (c):

(a) a base rubber containing polybutadiene having a stress relaxation time ($T_{80}$), as defined below, of 3.5 or less,
(b) an unsaturated carboxylic acid and/or a metal salt thereof, and
(c) an organic peroxide.

The stress relaxation time ($T_{80}$) is the time in seconds, from the moment when rotor rotation is stopped immediately after measurement of the $ML_{1+4}$ (100° C.) value (the Mooney viscosity measured at 100° C. in accordance with ASTM D-1646-96), that is required for the $ML_{1+4}$ value to decrease 80%.

The term "Mooney viscosity" used herein refers to an industrial indicator of viscosity as measured with a Mooney viscometer, which is a type of rotary plastometer. The unit symbol used is $ML_{1+4}$ (100° C.), where "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

In the practice of the invention, the polybutadiene in above component (a) includes a polybutadiene having a stress relaxation time ($T_{80}$) of 3.5 or less (which polybutadiene is sometimes abbreviated below as "BR1"). The $T_{80}$ value is preferably 3.0 or less, more preferably 2.8 or less, and even more preferably 2.5 or less. The $T_{80}$ value has a lower limit of preferably 1 or more, and more preferably 1.5 or more. At a $T_{80}$ value of more than 3.5, the objects of the invention cannot be attained. On the other hand, if the $T_{80}$ value is too small, problems with the workability may arise.

The foregoing polybutadiene BR1 has a Mooney viscosity ($ML_{1+4}$ (100° C.)) which, while not subject to any particular limitation, is preferably at least 20 but not more than 80.

It is recommended that the above polybutadiene BR1 have a cis-1,4 bond content of preferably 60%, more preferably at least 80%, even more preferably at least 90%, and most preferably at least 95%, and a 1,2-vinyl bond content of preferably at most 2%, more preferably at most 1.7%, even more preferably at most 1.5%, and most preferably at most 1.3%. At a cis-1',4 bond content or a 1,2-vinyl bond content outside of these ranges, the rebound may decrease.

From the standpoint of rebound, it is preferable for the above polybutadiene BR1 used in the invention to be a polybutadiene synthesized using a rare-earth catalyst.

A known rare-earth catalyst may be used for this purpose. Exemplary rare-earth catalysts include those made up of a combination of a lanthanide series rare-earth compound, an organoaluminum compound, an alumoxane, a halogen-bearing compound, and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in *Fine Chemical* 23, No. 9, 5

(1994), *J. Am. Chem. Soc.* 115, 4971 (1993), and *J. Am. Chem. Soc.* 117, 6465 (1995) are also acceptable.

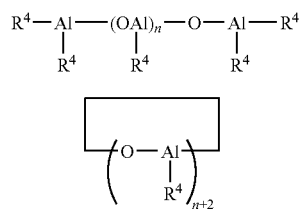

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of preferably from −30 to +150° C., and more preferably from 10 to 100° C.

To manufacture golf balls of stable quality, it is desirable for the above-described polybutadiene BR1 used in the invention to be a terminal-modified polybutadiene obtained by polymerization using the above-described rare-earth catalyst, followed by the reaction of a terminal modifier with active end groups on the polymer.

A known terminal modifier may be used for this purpose. Illustrative examples include compounds of types (1) to (6) below.

(1) Halogenated organometallic compounds, halogenated metallic compounds and organometallic compounds of the general formulas $R^5{}_nM'X_{4-n}$, $M'X_4$, $M'X_3$, $R^5{}_nM'(-R^6-COOR^7)_{4-n}$ or $R^5{}_nM'(-R^6-COR^7)_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(2) heterocumulene compounds having on the molecule a Y=C=Z linkage (wherein Y is a carbon, oxygen, nitrogen or sulfur atom; and Z is an oxygen, nitrogen or sulfur atom);

(3) three-membered heterocyclic compounds containing on the molecule the following bonds

(wherein Y is an oxygen, nitrogen or sulfur atom);

(4) halogenated isocyano compounds;

(5) carboxylic acids, acid halides, ester compounds, carbonate compounds and acid anhydrides of the formula $R^8-(COOH)_m$, $R^9(COX)_m$, $R^{10}-(COO-R^{11})$, $R^{12}-OCOO-R^{13}$, $R^{14}(COOCO-R^{15})_m$ or

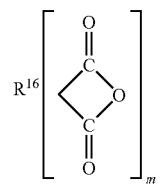

(wherein $R^8$ to $R^{16}$ are each independently a hydrocarbon group of 1 to 50 carbons, X is a halogen atom, and m is an integer from 1 to 5); and (6) carboxylic acid metal salts of the formula $R^{17}{}_lM''(OCOR^{18})_{4-l}$, $R^{19}{}_lM''(OCO-R^{20}-COOR^{21})_{4-l}$ or

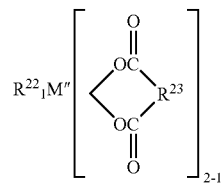

(wherein $R^{17}$ to $R^{23}$ are each independently a hydrocarbon group of 1 to 20 carbons, M'' is a tin, silicon or germanium atom, and the letter l is an integer from 0 to 3).

Specific examples of the above terminal modifiers (1) to (6) and methods for their reaction are described in, for example, JP-A 11-35633 and JP-A 7-268132.

In the practice of the invention, the above-described polybutadiene BR1 is included within the base rubber and accounts for preferably at least 40 wt %, more preferably at least 50 wt %, even more preferably at least 60 wt %, and even up to 100 wt %, of the base rubber. If this proportion is too low, the rebound may decrease.

No particular limitation is imposed on rubber compounds other than BR1 which may be included in the base rubber. For example, polybutadiene rubbers having a stress relaxation time $T_{80}$ of more than 3.5 may be included, as can also other rubber compounds such as styrene-butadiene rubbers (SBR), natural rubbers, polyisoprene rubbers and ethylene-propylene-diene rubbers (EPDM). These may be used individually or as combinations of two or more thereof.

The Mooney viscosity of such additional rubbers included in the base rubber, while not subject to any particular limitation, is preferably at least 20 but preferably not more than 80.

Rubbers synthesized with a group VIII catalyst may be used as such additional rubbers included in the base rubber. Exemplary group VIII catalysts include the following nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Polymerization using the above group VIII catalysts, and particularly a nickel or cobalt catalyst, can be carried out by a process in which, typically, the catalyst is continuously charged into a reactor together with a solvent and butadiene monomer, and the reaction conditions are suitably selected, such as a reaction temperature in a range of 5 to 60° C. and a reaction pressure in a range of atmospheric pressure to 70 plus atmospheres, so as to yield a product having the above-indicated Mooney viscosity.

Above component (b) may be an unsaturated carboxylic acid, specific examples of which include acrylic acid, methacrylic acid, maleic acid and fumaric acid. Acrylic acid and methacrylic acid are especially preferred. Alternatively, it may be the metal salt of an unsaturated carboxylic acid, examples of which include the zinc and magnesium salts of unsaturated fatty acids such as zinc dimethacrylate and zinc diacrylate. The use of zinc diacrylate is especially preferred.

It is recommended that the content of above component (b) per 100 parts by weight of the base rubber be preferably at least 10 parts by weight, and more preferably at least 15 parts by weight, but preferably not more than 60 parts by weight, more preferably not more than 50 parts by weight, even more preferably not more than 45 parts by weight, and most preferably not more than 40 parts by weight. Too much component (b) will make the material molded under heat from the rubber composition too hard, giving the golf ball an unpleasant feel on impact. On the other hand, too little will result in a lower rebound.

Above component (c) may be a commercially available product, suitable examples of which include Percumyl D (produced by NOF Corporation), Perhexa 3C (NOF Corporation) and Luperco 231XL (Atochem Co.). If necessary, a combination of two or more different organic peroxides may be used.

It is recommended that the amount of component (c) per 100 parts by weight of the base rubber be preferably at least 0.1 part by weight, and more preferably at least 0.3 part by weight, but preferably not more than 5 parts by weight, more preferably not more than 4 parts by weight, even more preferably not more than 3 parts by weight, and most preferably not more than 2 parts by weight. Too much or too little component (c) may make it impossible to obtain a suitable hardness distribution, resulting in a poor feel on impact, durability and rebound.

To further improve rebound, it is desirable for the rubber composition in the invention to include also the following component (d):

(d) an organosulfur compound.

Examples of such organosulfur compounds include thiophenols, thionaphthols, halogenated thiophenols, and metal salts thereof. Specific examples include the zinc salts of pentachlorothiophenol, pentafluorothiophenol, pentabromothiophenol and p-chlorothiophenol; and diphenylpolysulfides, dibenzylpolysulfides, dibenzoylpolysulfides, dibenzothiazoylpolysulfides and dithiobenzoylpolysulfides having 2 to 4 sulfurs. These may be used singly or as combinations of two or more thereof. Diphenyldisulfide and/or the zinc salt of pentachlorothiophenol are especially preferred.

It is recommended that the amount of component (d) included per 100 parts by weight of the base rubber be preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. Too much organosulfur compound may make the material molded under heat from the rubber composition too soft, whereas too little may make an improved rebound difficult to achieve.

The rubber composition in the invention may additionally include such additives as inorganic fillers and antioxidants. Illustrative examples of suitable inorganic fillers include zinc oxide, barium sulfate and calcium carbonate. The amount included per 100 parts by weight of the base rubber is preferably at least 5 parts by weight, more preferably at least 7 parts by weight, even more preferably at least 10 parts by weight, and most preferably at least 13 parts by weight, but preferably not more than 80 parts by weight, more preferably not more than 50 parts by weight, even more preferably not more than 45 parts by weight, and most preferably not more than 40 parts by weight. Too much or too little inorganic filler may make it impossible to obtain a proper golf ball weight and a suitable rebound.

To increase the rebound, it is desirable for the inorganic filler to include zinc oxide in an amount of at least 50 wt %, preferably at least 75 wt %, and most preferably 100 wt % (where the zinc oxide accounts for 100% of the inorganic filler).

The zinc oxide has an average particle size (by air permeametry) of preferably at least 0.01 µm, more preferably at least 0.05 µm, and most preferably at least 0.1 µm, but preferably not more than 2 µm, and more preferably not more than 1 µm.

Examples of suitable commercial antioxidants include 2,2'-methylenebis(4-methyl-6-t-butylphenol) (Nocrac NS-6, available from Ouchi Shinko Chemical Industry Co., Ltd.) and 2,2'-methylenebis(4-ethyl-6-t-butylphenol) (Nocrac NS-5, Ouchi Shinko Chemical Industry Co., Ltd.). To achieve a good rebound and durability, it is recommended that the amount of antioxidant included per 100 parts by weight of the base rubber be preferably more than 0 part by weight, more preferably at least 0.05 part by weight, even more preferably at least 0.1 part by weight, and most preferably at least 0.2 part by weight, but preferably not more than 3 parts by weight, more preferably not more than 2 parts by weight, even more preferably not more than 1 part by weight, and most preferably not more than 0.5 part by weight.

The core in the present invention can be obtained by vulcanizing and curing the rubber composition using a method of the same sort as that used on prior-art rubber compositions for golf balls. Vulcanization may be carried out, for example, at a temperature of from 100 to 200° C. for a period of 10 to 40 minutes.

It is recommended that the core (hot-molded material) in the invention have a hardness difference, obtained by subtracting the JIS-C hardness at the center of the hot-molded material from the JIS-C hardness at the surface of the material, of preferably at least 15, more preferably at least 16, even more preferably at least 17, and most preferably at least 18, but preferably not more than 50, and more preferably not more than 40. Setting the hardness within this range is desirable for achieving a golf ball having a soft feel and a good rebound and durability.

It is also recommended that the core (hot-molded material) in the invention have a deflection, when compressed under a final load of 1275 N (130 kgf) from an initial load of 98 N (10 kgf), of preferably at least 2.0 mm, more preferably at least 2.5 mm, and even more preferably at least 2.8 mm, but preferably not more than 6.0 mm, more preferably not more than 5.5 mm, even more preferably not more than 5.0 mm, and most preferably not more than 4.5 mm. Too small a deflection may worsen the feel of the ball on impact and, particularly on long shots such as with a driver in which the ball incurs a large deformation, may subject the ball to an excessive rise in spin, shortening the distance traveled by the ball. On the other hand, a hot-molded material that is too soft may deaden the feel of the golf ball when played and compromise the rebound of the ball, resulting in a shorter distance, and may give the ball a poor durability to cracking with repeated impact.

It is recommended that the core have a diameter of preferably at least 30.0 mm, more preferably at least 32.0 mm, even more preferably at least 35.0 mm, and most preferably at least 37.0 mm, but preferably not more than 41.0 mm, more preferably not more than 40.5 mm, even more preferably not more than 40.0 mm, and most preferably not more than 39.5 mm.

In particular, it is recommended that such a solid core in a solid two-piece golf ball have a diameter of preferably at least 37.0 mm, more preferably at least 37.5 mm, even more preferably at least 38.0 mm, and most preferably at least 38.5 mm, but preferably not more than 41.0 mm, more preferably not more than 40.5 mm, and even more preferably not more than 40.0 mm.

It is recommended that such a solid core in a solid three-piece golf ball have a diameter of preferably at least 30.0 mm, more preferably at least 32.0 mm, even more preferably at least 34.0 mm, and most preferably at least 35.0 mm, but preferably not more than 40.0 mm, more preferably not more than 39.5 mm, and even more preferably not more than 39.0 mm.

It is also recommended that the core have a specific gravity of preferably at least 0.9, more preferably at least 1.0, and even more preferably at least 1.1, but preferably not more than 1.4, more preferably not more than 1.3, and even more preferably not more than 1.2.

Next, in the present invention, at least one layer of the one or more cover layers is formed primarily of a material molded from a heated mixture selected from among (I), (II) and (III) above.

The heated mixture includes either (A) an olefin-unsaturated carboxylic acid random copolymer and/or an olefin-unsaturated carboxylic acid-unsaturated carboxylic acid ester random copolymer or (D) a metal ion neutralization product of an olefin-unsaturated carboxylic acid random copolymer and/or a metal ion neutralization product of an olefin-unsaturated carboxylic acid-unsaturated carboxylic acid ester random copolymer alone, or includes both components A and D.

Here, the olefin in component A is one having preferably at least 2 carbons, but preferably not more than 8 carbons, and more preferably not more than 6 carbons. Illustrative examples include ethylene, propylene, butene, pentene, hexene, heptene and octene. Ethylene is especially preferred.

Preferred examples of the unsaturated carboxylic acid include acrylic acid, methacrylic acid, maleic acid and fumaric acid. Acrylic acid and methacrylic acid are especially preferred.

The unsaturated carboxylic acid ester is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Of these, butyl acrylate (n-butyl acrylate, i-butyl acrylate) is especially preferred.

The random copolymer of component A of the invention may be obtained by random copolymerization of the foregoing ingredients according to a known method. It is recommended that the content of unsaturated carboxylic acid (acid content) included in the random copolymer be preferably at least 2 wt %, more preferably at least 6 wt %, and even more preferably at least 8 wt %, but preferably not more than 25 wt %, more preferably not more than 20 wt %, and even more preferably not more than 15 wt %. If the acid content is too low, the rebound resilience may decrease. On the other hand, if the acid content is too high, the processability may decrease.

The random copolymer neutralization product of component D of the invention may be obtained by neutralizing some of the acid groups on the random copolymer with metal ions. Illustrative examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, $Na^+$, $Li^+$, $Zn^{++}$ and $Mg^{++}$ are preferred, and $Zn^{++}$ is especially preferred. The degree to which the random copolymer is neutralized by these metal ions is not subject to any particular limitation. The neutralization product may be obtained by a known method, such as one that involves introducing to the random copolymer a suitable compound, examples of which include formates, acetates, nitrates, carbonates, bicarbonates, oxides, hydroxides and alkoxides of the above metal ions.

Illustrative examples of the random copolymer serving as component A of the invention include Nucrel AN4311, Nucrel AN4318 and Nucrel 1560 (all products of DuPont-Mitsui Polychemicals Co., Ltd.). Illustrative examples of the random copolymer neutralization product serving as component D of the invention include Himilan 1554, Himilan 1557, Himilan 1601, Himilan 1605, Himilan 1706, Himilan 1855, Himilan 1856 and Himilan AM7316 (all products of DuPont-Mitsui Polychemicals Co., Ltd.), and Surlyn 6320, Surlyn 7930 and Surlyn 8120 (all products of E.I. DuPont de Nemours & Co.). The use of a zinc-neutralized ionomer resin (e.g., Himilan AM7316) is especially preferred.

In the practice of the invention, the random copolymer (component A) and/or neutralization product thereof (component D) used as the base resin may be one of these alone or may be a combination of both the random copolymer with a neutralization product thereof. If both are used in combination, the proportions therebetween are not subject to any particular limitation.

Component B of the invention is a fatty acid having a molecular weight of at least 280 or a derivative thereof. It is a component which improves the flow properties of the heated mixture. Compared with the thermoplastic resin serving as component A, this component has a very low molecular weight and helps to greatly increase the melt viscosity of the mixture. Because the fatty acid (or derivative thereof) has a molecular weight of 280 or more and includes a high content of acid groups (or derivatives thereof), the loss of resilience due to the addition thereof is small.

The fatty acid or fatty acid derivative of component B of the invention may be an unsaturated fatty acid (or derivative thereof) containing a double bond or triple bond on the alkyl moiety, or it may be a saturated fatty acid (or derivative thereof) in which the bonds on the alkyl moiety are all single bonds. It is recommended that the number of carbons on the molecule be preferably at least 18, but preferably not more than 80, and more preferably not more than 40. Too few carbons may make it impossible to improve the heat resistance, which is an object of the invention, and may also make the acid group content so high as to diminish the flow-improving effect due to interactions with acid groups present in the base resin. On the other hand, too many carbons increases the molecular weight, as a result of which the flow-improving effect may diminish.

Specific examples of the fatty acid of component B include stearic acid, 12-hydroxystearic acid, behenic acid, oleic acid, linoleic acid, linolenic acid, arachidic acid and lignoceric acid. Of these, stearic acid, arachidic acid, behenic acid and lignoceric acid are preferred.

The fatty acid derivative in the invention is a compound in which the proton on the acid group of the fatty acid has been replaced. Such fatty aid derivatives are exemplified by metallic soaps in which the proton on the acid group of the fatty acid has been replaced with a metal ion. Examples of the metal ion include $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of fatty acid derivatives that may be used as component B include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Moreover, use may be made of known metal soap-modified ionomers (such as those mentioned in U.S. Pat. No. 5,312,857, U.S. Pat. No. 5,306,760 and International Application WO 98/46671) when using the above-described component A and/or D and component B.

In the above-described heated mixture, a basic inorganic filler capable of neutralizing acid groups in above component A and/or D and in above component B is added as component C. When, as mentioned in the prior-art examples, component A and/or D and component B alone, and in particular a metal-modified ionomer resin alone (e.g., a metal soap-modified ionomer resin of the type mentioned in the foregoing patent publications, alone), are heated and mixed, as shown below, the metallic soap and un-neutralized acid groups present on the ionomer undergo exchange reactions, generating a fatty acid. Because the fatty acid has a low thermal stability and readily vaporizes during molding, it causes molding defects. Moreover, if the fatty acid thus generated deposits on the surface of the molded material, it may substantially lower paint film adhesion.

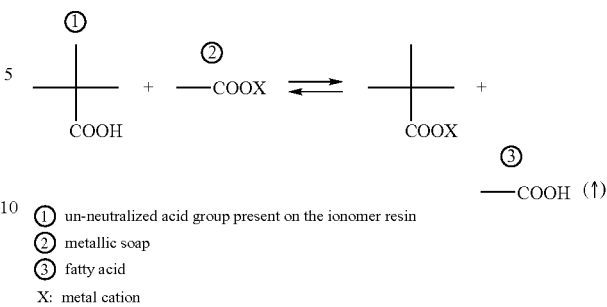

① un-neutralized acid group present on the ionomer resin
② metallic soap
③ fatty acid
X: metal cation In the invention, to solve this problem, the material includes also, as component C, a basic inorganic metal compound which neutralizes the acid groups present in above components A and/or D and component B. The inclusion of component C as an essential ingredient confers excellent properties. That is, the acid groups in above components A and/or D and component B are neutralized, and synergistic effects from the blending of each of these respective components increase the thermal stability of the heated mixture while at the same time conferring a good moldability and enhancing the resilience.

It is recommended that above component C be a basic inorganic metal compound, preferably a monoxide, which is capable of neutralizing acid groups in above components A and/or D and in component B. Because such compounds have a high reactivity with the ionomer resin and the reaction by-products contain no organic matter, the degree of neutralization of the heated mixture can be increased without a loss of thermal stability.

The metal ions used here in the basic inorganic metal compound are exemplified by $Li^+$, $Na^+$, $K^+$, $Ca^{++}$, $Mg^{++}$, $Zn^{++}$, $Al^{+++}$, $Ni^+$, $Fe^{++}$, $Fe^{+++}$, $Cu^{++}$, $Mn^{++}$, $Sn^{++}$, $Pb^{++}$ and $Co^{++}$. Illustrative examples of the inorganic metal compound include basic inorganic fillers containing these metal ions, such as magnesium oxide, magnesium hydroxide, magnesium carbonate, zinc oxide, sodium hydroxide, sodium carbonate, calcium oxide, calcium hydroxide, lithium hydroxide and lithium carbonate. As noted above, a monoxide is preferred. The use of magnesium oxide, which has a high reactivity with ionomer resins, is especially preferred.

The above heated mixture prepared as described above from components A, D, B and C can be provided with an improved thermal stability, moldability and resilience. To achieve these ends, the components must be formulated in certain proportions. Specifically, it is essential to include, per 100 parts by weight of component A and/or component D (referred to below as the "base resin"), at least 5 parts by weight, but not more than 80 parts by weight, preferably not more than 40 parts by weight, and more preferably not more than 20 parts by weight, of component B; and at least 0.1 part by weight but not more than 10 parts by weight, and preferably not more than 5 parts by weight, of component C. Too little component B lowers the melt viscosity, resulting in a poor processability, whereas too much lowers the durability. Too little component C fails to improve thermal stability and resilience, whereas too much instead lowers the heat resistance of the composition due to the presence of excess basic inorganic metal compound.

The above material may be used directly as the heated mixture, or other ingredients may be suitably included in the mixture. In either case, it is critical for the heated mixture to have a melt index, as measured according to JIS K6760 at a test temperature of 190° C. and a test load of 21 N (2.16 kgf), of at least 1.0 dg/min, preferably at least 1.5 dg/min, and more preferably at least 2.0 dg/min. It is recommended that the upper limit be preferably 20 dg/min or less, and more preferably 15 dg/min or less. However, if the heated mixture has a low melt index, the result will be a marked decline in processability.

It is preferable for the heated mixture to be have, in infrared absorption spectroscopy, a specific relative absorbance at the absorption peak attributable to carboxylate anion stretching vibrations at 1530 to 1630 cm$^{-1}$ with respect to the absorbance at the absorption peak attributable to carbonyl stretching vibrations normally detected at 1690 to 1710 cm$^{-1}$. This ratio may be expressed as follows: (absorbance at absorption peak attributable to carboxylate anion stretching vibrations)/(absorbance at absorption peak attributable to carbonyl stretching vibrations).

Here, "carboxylate anion stretching vibrations" refers to vibrations by carboxyl groups from which the proton has dissociated (metal ion-neutralized carboxyl groups), and "carbonyl stretching vibrations" refers to vibrations by undissociated carboxyl groups. The ratio between these respective peak intensities depends on the degree of neutralization. In the ionomer resins having a degree of neutralization of about 50 mol % which are commonly used, the ratio between these peak absorbances is about 1:1.

To improve the thermal stability, moldability and resilience of the material, it is recommended that the above heated mixture have a peak absorbance attributable to carboxylate anion stretching vibrations which is preferably at least 1.5 times, and more preferably at least 2 times, the peak absorbance attributable to carbonyl stretching vibrations. The absence of any peaks attributable to carbonyl stretching vibrations is especially preferred.

The thermal stability of the above material can be measured by thermogravimetry. It is recommended that, in thermogravimetry, the heated mixture have a weight loss at 250° C., based on the weight of the mixture at 25° C., of preferably not more than 2 wt %, more preferably not more than 1.5 wt %, and even more preferably not more than 1 wt %.

It is recommended that the specific gravity of the heated mixture proper, while not subject to any particular limitation, be preferably at least 0.9, but preferably not more than 1.5, more preferably not more than 1.3, and even more preferably not more than 1.1.

The heated mixed is obtained by heating and mixing the above-described component A and/or component D, with component B and component C, and has an optimized melt index. It is recommended that preferably at least 70 molt, more preferably at least 80 molt, and even more preferably at least 90 molt, of the acid groups in the heated mixture be neutralized. A high degree of neutralization makes it possible to more reliably suppress the exchange reactions that are a problem when only the above-described base resin and the fatty acid (or a derivative thereof) are used, thus preventing the formation of fatty acids. As a result, there can be obtained a material which has a greatly increased thermal stability and a good moldability, and which moreover has a much improved resilience compared with prior-art ionomer resins.

Here, with regard to neutralization of the heated mixture, to more reliably achieve both a high degree of neutralization and good flow properties, it is recommended that the acid groups in the heated mixture be neutralized with transition metal ions and with alkali metal and/or alkaline earth metal ions. Transition metal ions have a weaker ionic cohesion than alkali metal and alkaline earth metal ions and so neutralize some of the acid groups in the heated mixture, enabling the flow properties to be significantly improved.

The molar ratio between the transition metal ions and the alkali metal and/or alkaline earth metal ions is set as appropriate, preferably in a range of 10:90 to 90:10, and more preferably from 20:80 to 80:20. Too low a molar ratio of transition metal ions may fail to provide sufficient improvement in the flow properties of the material. On the other hand, a molar ratio that is too high may lower the resilience.

Specific examples of such metal ions include zinc ions as the transition metal ions and at least one type of ion selected from among sodium, lithium and magnesium ions as the alkali metal or alkaline earth metal ions.

No particular limitation is imposed on the method used to obtain the heated mixture in which the acid groups have been neutralized with transition metal ions and alkali metal or alkaline earth metal ions. Specific examples of methods of neutralization with transition metal ions, particularly zinc ions, include a method in which a zinc soap is used as the fatty acid derivative, a method in which a zinc ion neutralization product is included as component D in the base resin (e.g., a zinc-neutralized ionomer resin), and a method in which zinc oxide is used as the basic inorganic metal compound of component C.

As already noted, to obtain the above material, it suffices to use the above heated mixture as the essential ingredients, although various additives may be optionally included as well. For example, when the heated mixture is to be used as a cover stock, additives such as pigments, dispersants, antioxidants, ultraviolet absorbers and optical stabilizers may be included within the above heated mixture. To improve the feel of the golf ball on impact, the material of the invention may also include, in addition to the above essential ingredients, various non-ionomeric thermoplastic elastomers. Illustrative examples of such non-ionomeric thermoplastic elastomers include olefin elastomers, styrene elastomers, ester elastomers and urethane elastomers. The use of olefin elastomers and styrene elastomers is especially preferred.

The method of preparing the above material is not subject to any particular limitation. For example, to obtain a golf ball cover stock which includes the above material, mixture may be carried out under heating at a temperature of between 150 and 250° C. using as the mixing apparatus an internal mixer such as a kneading-type twin-screw extruder, a Banbury mixer or a kneader. The manner in which the various additives other than the essential ingredients are incorporated into the heated mixture, while not subject to any particular limitation, is exemplified by a method in which the additives are blended together with the essential ingredients and at the same time mixed under heating, and a method in which the essential ingredients are first mixed together under heating, following which the optional additives are added and further mixing under heating is carried out.

The golf ball of the invention is a golf ball formed using the above heated mixture. The layer formed with the heated mixture may make up part or all of the golf ball. The golf ball of the invention may be a thread-wound golf ball (including one in which the cover is composed of a single layer or has a multilayer structure of two or more layers), a two-piece golf ball, a three-piece golf ball, or a multi-piece golf ball having a cover of three or more layers.

To obtain the golf ball of the invention, it suffices to enclose the core with the above-described heated mixture so as to form a cover. For example, use may be made of a method which involves placing within a mold a single-layer core or a multi-layer core of two or more layers that has been pre-fabricated according to the type of ball, mixing and melting the cover material of the invention under applied heat, and injection-molding the heated mixture over the core. In this way, the golf ball manufacturing operations can be carried out in a state that ensures an outstanding thermal stability, flow and moldability, enabling the golf ball ultimately obtained to have a high rebound.

The cover-forming method is not limited to the foregoing method. For example, use may be made of a method in which first a pair of hemispherical half-cups is molded from the cover material of the invention, following which the half-cups are placed over a core and molded under pressure at 120 to 170° C. for 1 to 5 minutes.

The thickness of the cover formed of the above heated mixture as the molding material is not subject to any particular limitation, although the cover may be formed to a thickness of preferably at least 1 mm, and more preferably at least 1.3 mm, but preferably not more than 4 mm, and more preferably not more than 2.3 mm. The cover of the inventive ball is not limited to one layer, and may be formed so as to have a multilayer structure of two or more layers. When the cover has a multilayer structure, the cover material of the invention may be used either at the inner side of the multilayer structure or in the outermost cover layer. In the practice of the invention, when the golf ball has a single-layer cover, the cover material of the invention is preferably used to form the cover. When the golf ball has a cover of two or more layers, the cover material of the invention may be suitably used in an inner cover layer other than the outermost cover layer.

The surface of the outermost cover layer may have a plurality of dimples formed thereon, and the cover may be administered various treatments, such as surface preparation, stamping and painting. In particular, the ease of operation involved in administering such surface treatment to a golf ball cover made of the cover material of the invention can be improved on account of the good moldability of the cover surface.

In golf balls formed in the above-described manner, parameters such as the diameter, weight and hardness of the above-described cover, solid or liquid center, solid core and thread-wound core may be suitably adjusted within ranges where the objects of the invention can be obtained, and are not subject to any particular limitations.

The golf ball of the invention, which can be manufactured so as to conform with the Rules of Golf for competitive play, may be produced to a ball diameter of not less than 42.67 mm and a weight of not more than 45.93 g.

The golf ball of the invention uses as the core a material of exceptional resilience that has been molded under heat from a rubber composition, as a result of which the ball as a whole has an excellent rebound. Moreover, the golf ball of the invention uses as the cover material a highly neutralized ionomer resin having a good thermal stability, flow and moldability, enabling the ball to be efficiently manufactured. Synergistic effects between the core material and the cover material enhance the rebound of the ball.

EXAMPLES

The following Examples and Comparative examples are provided by way of illustration and not by way of limitation.

Examples 1 and 2, Comparative Examples 1 to 4

Using a core material composed primarily of the polybutadiene shown in Table 1 below, a solid core having a diameter of 38.6 mm, a weight of 35.1 g, and a deflection adjusted to 3.2 mm or 3.3 mm was produced. The deflection was the measured amount of deformation by the core when compressed under a final load of 1,275 N (130 kgf) from an initial load of 98 N (10 kgf).

TABLE 1

|  |  | Core No. | | | |
| --- | --- | --- | --- | --- | --- |
|  |  | No. 1 | No. 2 | No. 3 | No. 4 |
| Formulation (pbw) | Polybutadiene EC140 | 100 |  |  |  |
|  | Polybutadiene BR51 |  | 100 |  |  |
|  | Polybutadiene BR60 |  |  | 100 |  |
|  | Polybutadiene BR01 |  |  |  | 100 |
|  | Peroxide | 1 | 1 | 1 | 1 |
|  | Zinc oxide | 18.2 | 18.2 | 18.2 | 18.2 |
|  | Antioxidant | 0.2 | 0.2 | 0.2 | 0.2 |
|  | Zinc diacrylate | 32 | 32 | 32 | 32 |
|  | Zinc salt of pentachlorothiophenol | 1.1 | 1.1 | 1.1 | 1.1 |
|  | Zinc stearate | 5 | 5 | 5 | 5 |
| Properties | Diameter (mm) | 38.6 | 38.6 | 38.6 | 38.6 |
|  | Weight (g) | 35.1 | 35.1 | 35.1 | 35.1 |
|  | Deflection (mm) | 3.3 | 3.3 | 3.3 | 3.2 |

Details of the above formulation are provided below.

Polybutadiene rubber:
  EC140 (trade name), available from Firestone Polymers. Polymerized with a neodymium catalyst. Mooney viscosity, 43; $T_{80}$ value, 2.3.

Polybutadiene rubber:
  BR51 (trade name), available from JSR Corporation. Polymerized with a neodymium catalyst. Mooney viscosity, 39; $T_{80}$ value, 5.0.

Polybutadiene rubber:
  BR60 (trade name), available from Polimeri Srl. Polymerized with a neodymium catalyst. Mooney viscosity, 57; $T_{80}$ value, 4.6.

Polybutadiene rubber:
  BR01 (trade name), available from JSR Corporation. Polymerized with a nickel catalyst. Mooney viscosity, 48; $T_{80}$ value, 8.4.

Peroxide: Dicumyl peroxide, available from NOF Corporation under the trade name Percumyl D.

Zinc oxide: Available from Sakai Chemical Industry Co., Ltd. under the trade name Sanshu Sanka Aen; average particle size, 0.6 µm (air permeametry).

Antioxidant: Nocrac NS-6 (trade name), available from Ouchi Shinko Chemical Industry Co., Ltd.

Zinc diacrylate: Available from Nippon Shokubai Co., Ltd. Zinc stearate: Available from NOF Corporation under the trade name Zinc Stearate G.

Next, the cover materials M, N and O shown in Table 2 were mixed at 200° C. in a kneading-type twin-screw extruder, giving a pelletized cover stock, following which the cover stock was injected into a mold in which the above-described solid core had been placed, thereby manufacturing a two-piece solid golf ball having a diameter of 42.8 mm and having a 2.1 mm thick cover.

The properties of each golf ball were evaluated as described below. The results are shown in Table 3.

Ball Deflection (mm)

The amount of deformation (mm) by the golf ball when compressed under a final load of 1,275 N (130 kgf) from an initial load state of 98 N (10 kgf) was determined.

Initial Velocity

The initial velocity was measured using an initial velocity measuring apparatus of the same type as that of the official golf ball regulating-body—R&A (USGA), and in accordance with R&A (USGA) rules.

Relative Absorbance at Carboxylate Anion Absorption Peak

The transmission method was used to measure infrared absorption by the specimen. In infrared absorption measurements of samples having a thickness adjusted so that the peak transmittance associated with hydrocarbon chains that is observed near 2900 $cm^{-1}$ is about 90%, the absorbance at the absorption peak attributable to carbonyl stretching vibrations (1690 to 1710 $cm^{-1}$) was assigned a value of 1 and the ratio therewith of absorbance at the absorption peak attributable to carboxylate anion stretching vibrations (1530 to 1630 $cm^{-1}$) was computed as the relative absorbance.

Weight Loss Ratio

To eliminate the influence of moisture, samples that had been dried at 50° C. for 24 hours in a dry hopper were used for measurement. Thermogravimetric measurement from 25° C. to 300° C. at a temperature-ramp-up rate of 10° C./min was carried out on about 5 mg of each sample within a nitrogen atmosphere (flow rate, 100 ml/min), and the percent decrease in the weight of the sample at 250° C. with respect to the weight of the sample at 25° C. was determined.

Degree of Neutralization

Of the total acid groups (including acid groups in fatty acids (and derivatives thereof)) included in the heated mixture, the molar fraction of acid groups neutralized by metal ions was calculated from the acid content, degree of neutralization and molecular weight of the starting materials.

Ratio of Transition Metal Ions

Of the metal ions which neutralize acid groups present in the heated mixture, the molar fraction of transition metal ions was determined from the acid content, degree of neutralization and molecular weight of the starting materials.

Melt Flow Rate

The melt flow rate of the material was measured in accordance with JIS-K6760 (test temperature, 190° C.; test load, 21 N (2.16 kgf)).

Extrudability

The extrudability of each cover material when kneaded at 200° C. with a co-rotating intermeshing twin-screw extruder (screw diameter, 32 mm; main motor output, 7.5 kW) commonly used for mixing materials was rated according to the following criteria.

Good: Extrudable

NG: Cannot be extruded due to excess loading

Trade names and materials appearing in the table are explained below.

Nucrel AN4318: An ethylene-methacrylic acid-acrylic acid ester copolymer having an acid content of 8 wt % and an ester content of 17 wt %. Produced by DuPont-Mitsui Polychemicals Co., Ltd.

Nucrel 1560: An ethylene-methacrylic acid copolymer having an acid content of 15 wt %. Produced by DuPont-Mitsui Polychemicals Co., Ltd.

Himilan AM7316: A ternary zinc ionomer having an acid content of 10 wt %, a degree of neutralization of 50 mol % and an ester content of 24 wt %. Produced by DuPont-Mitsui Polychemicals Co., Ltd.

Surlyn 6320: A ternary magnesium ionomer having an acid content of 10 wt %, a degree of neutralization of 50 mol % and an ester content of 24 wt %. Produced by E.I. DuPont de Nemours & Co.

Behenic acid: Produced by NOF Corporation under the trade name NAA-222S.

Magnesium oxide: A highly active type of magnesium oxide produced by Kyowa Chemical Industry under the trade name Micromag 3-150.

TABLE 2

| | Resin components | | M | N | O |
|---|---|---|---|---|---|
| Formulation (pbw) | Component A | Nucrel AN4318 | 100 | | |
| | | Nucrel 1560 | | 50 | |
| | Component D | Himilan AM7316 | | 50 | |
| | | Surlyn 6320 | | | 100 |
| | Component B | Behenic acid | 20 | 20 | |
| | | Magnesium stearate | | | 20 |
| | Component C | Magnesium oxide | 3.0 | 2.4 | |
| | | Titanium dioxide | 2 | 2 | 2 |
| Resin properties | Extrudability | | good | good | good |
| | Degree of neutralization (mol %) | | 98 | 73 | 68 |
| | Transition metal ion ratio | | 0 | 20 | 0 |
| | Melt flow rate (dg/min) | | 1.6 | 4.5 | 2.5 |
| | Weight loss ratio (wt %) | | 0.6 | 1.5 | 2.5 |
| | Relative absorbance at carboxylate anion absorption peak | | 2.6 | 1.8 | 1.5 |
| | Cover hardness (Shore D) | | 50 | 54 | 50 |
| | Specific gravity | | 0.97 | 0.97 | 0.97 |

TABLE 3

| | Example | | Comparative Example | | | |
|---|---|---|---|---|---|---|
| | 1 | 2 | 1 | 2 | 3 | 4 |
| Core No. | No. 1 | No. 1 | No. 1 | No. 2 | No. 3 | No. 4 |
| Cover No. | M | N | O | M | M | M |
| Weight (g) | 45.2 | 45.2 | 45.2 | 45.2 | 45.2 | 45.2 |
| Deflection (mm) | 2.97 | 2.93 | 2.96 | 2.98 | 2.97 | 2.89 |
| Initial velocity (m/s) | 77.1 | 77.3 | 76.7 | 76.4 | 76.3 | 76.1 |

The results of the above examples of the invention and comparative examples are summarized below.

Examples 1 and 2 are golf balls according to the invention which are composed of a core that is made of polybutadiene having a $T_{80}$ value of 2.3 and is enclosed by a cover material which includes behenic acid as component B and magnesium oxide as component C. By contrast, in Comparative Example 1, the base resin includes magnesium stearate as component B but does not include any component C, resulting in a ball that has a poor rebound. In Comparative Examples 2, 3 and 4, the cover material is the same as in Example 1, but the core uses rubbers having $T_{80}$ values of respectively 5.0, 4.6 and 8.4, which are all larger than the $T_{80}$ value according to the present invention. As a result, the ball has a poor rebound.

The invention claimed is:

1. A golf ball comprising a core and a cover of one or more layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; and at least one layer of the cover is made of a heated mixture which includes (A) 100 parts by weight of an olefin-unsaturated carboxylic acid random copolymer and/or an olefin-unsaturated carboxylic acid-unsaturated carboxylic acid ester random copolymer, (B) from 5 to 80 parts by weight of a fatty acid having a molecular weight of at least 280 or a derivative thereof and (C) from 0.1 to 10 parts by weight of a basic inorganic metal compound capable of neutralizing acid groups in components A and B, and which has a melt index of at least 1.0 dg/min.

2. The golf ball of claim 1, wherein the rubber composition further comprises (d) an organosulfur compound.

3. The golf ball of claim 1, wherein the polybutadiene having a stress relaxation time ($T_{80}$) of 3.5 or less accounts for at least 40 wt % of the base rubber.

4. The golf ball of claim 1, wherein the polybutadiene having a stress relaxation time ($T_{80}$) of 3.5 or less is a polybutadiene prepared using a rare-earth catalyst.

5. The golf ball of claim 1, wherein the polybutadiene having a stress relaxation time ($T_{80}$) of 3.5 or less is a polybutadiene prepared by polymerization using a rare-earth catalyst, followed by terminal modification.

6. The golf ball of claim 1, wherein the basic inorganic metal compound is selected from the group consisting of magnesium oxide, magnesium hydroxide, magnesium carbonate, zinc oxide, sodium hydroxide, sodium carbonate, calcium oxide, calcium hydroxide, lithium hydroxide and lithium carbonate.

7. A golf ball comprising a core and a cover of one or more layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; and at least one layer of the cover is made of a heated mixture which includes (D) 100 parts by weight of a metal ion neutralization product of an olefin-unsaturated carboxylic acid random copolymer and/or a metal ion neutralization product of an olefin-unsaturated carboxylic acid-unsaturated carboxylic acid ester random copolymer, (B) from 5 to 80 parts by weight of a fatty acid having a molecular weight of at least 280 or a derivative thereof and (C) from 0.1 to 10 parts by weight of a basic inorganic metal compound capable of neutralizing acid groups in components D and B, and which has a melt index of at least 1.0 dg/min.

8. The golf ball of claim 7, wherein the rubber composition further comprises (d) an organosulfur compound.

9. The golf ball of claim 7, wherein the polybutadiene having a stress relaxation time ($T_{80}$) of 3.5 or less accounts for at least 40 wt % of the base rubber.

10. The golf ball of claim 7, wherein the polybutadiene having a stress relaxation time ($T_{80}$) of 3.5 or less is a polybutadiene prepared using a rare-earth catalyst.

11. The golf ball of claim 7, wherein the polybutadiene having a stress relaxation time ($T_{80}$) of 3.5 or less is a polybutadiene prepared by polymerization using a rare-earth catalyst, followed by terminal modification.

12. The golf ball of claim 7, wherein the basic inorganic metal compound is selected from the group consisting of magnesium oxide, magnesium hydroxide, magnesium carbonate, zinc oxide, sodium hydroxide, sodium carbonate, calcium oxide, calcium hydroxide, lithium hydroxide and lithium carbonate.

13. A golf ball comprising a core and a cover of one or more layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide; and at least one layer of the cover is made of a heated mixture which includes 100 parts by weight of, in admixture, (A) an olefin-unsaturated carboxylic acid random copolymer and/or an olefin-unsaturated carboxylic acid-unsaturated carboxylic acid ester random copolymer and (D) a metal ion neutralization product of an olefin-unsaturated carboxylic acid random copolymer and/or a metal ion neutralization product of an olefin-unsaturated carboxylic acid-unsaturated carboxylic acid ester random copolymer, (B) from 5 to 80 parts by weight of a fatty acid having a molecular weight of at least 280 or a derivative thereof and (C) from 0.1 to 10 parts by weight of a basic inorganic metal compound capable of neutralizing acid groups in components A, D and B, and which has a melt index of at least 1.0 dg/min.

14. The golf ball of claim 13, wherein the rubber composition further comprises (d) an organosulfur compound.

15. The golf ball of claim 13, wherein the polybutadiene having a stress relaxation time ($T_{80}$) of 3.5 or less accounts for at least 40 wt % of the base rubber.

16. The golf ball of claim 13, wherein the polybutadiene having a stress relaxation time ($T_{80}$) of 3.5 or less is a polybutadiene prepared using a rare-earth catalyst.

17. The golf ball of claim 13, wherein the polybutadiene having a stress relaxation time ($T_{80}$) of 3.5 or less is a polybutadiene prepared by polymerization using a rare-earth catalyst, followed by terminal modification.

18. The golf ball of claim 13, wherein the basic inorganic metal compound is selected from the group consisting of magnesium oxide, magnesium hydroxide, magnesium carbonate, zinc oxide, sodium hydroxide, sodium carbonate, calcium oxide, calcium hydroxide, lithium hydroxide and lithium carbonate.

* * * * *